(12) United States Patent
Casey et al.

(10) Patent No.: US 8,444,202 B2
(45) Date of Patent: May 21, 2013

(54) DISPLAY SURROUND

(75) Inventors: Gary James Casey, Ilford (GB); Anthony Raymond Stevens, Harlow (GB)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 13/324,249

(22) Filed: Dec. 13, 2011

(65) Prior Publication Data

US 2012/0153656 A1      Jun. 21, 2012

(30) Foreign Application Priority Data

Dec. 16, 2010   (GB) .................................. 1021383.3

(51) Int. Cl.
*B60K 37/00*      (2006.01)

(52) U.S. Cl.
USPC .......... 296/70; 296/24.34; 296/72; 296/37.12

(58) Field of Classification Search
USPC ............... 296/29, 39.1, 39.3, 24.34, 1.08, 70, 296/73, 37.12
See application file for complete search history.

(56) References Cited

U.S. PATENT DOCUMENTS

| | | | | |
|---|---|---|---|---|
| 4,560,602 | A * | 12/1985 | Draper | 428/79 |
| 5,823,602 | A | 10/1998 | Kelman et al. | |
| 6,846,031 | B2 * | 1/2005 | Pandura | 296/70 |
| 7,096,818 | B2 * | 8/2006 | Kalil | 114/364 |
| 7,954,851 | B2 * | 6/2011 | Sato | 280/752 |
| 2004/0026952 | A1 * | 2/2004 | Shiono | 296/70 |
| 2006/0175858 | A1 * | 8/2006 | Pegorier et al. | 296/70 |
| 2006/0214461 | A1 * | 9/2006 | Kornylo et al. | 296/70 |
| 2006/0214462 | A1 * | 9/2006 | Cowelchuk et al. | 296/70 |
| 2009/0266635 | A1 * | 10/2009 | Sato | 180/90 |
| 2010/0213691 | A1 * | 8/2010 | Schupbach | 280/728.3 |
| 2011/0133509 | A1 * | 6/2011 | Iida et al. | 296/70 |

FOREIGN PATENT DOCUMENTS

| | | |
|---|---|---|
| CN | 10315249 | 5/1997 |
| CN | 2002046133 | 8/2000 |

\* cited by examiner

*Primary Examiner* — Glenn Dayoan
*Assistant Examiner* — Pinel Romain
(74) *Attorney, Agent, or Firm* — Fraser Clemens Martin & Miller LLC; J. Douglas Miller

(57) ABSTRACT

This disclosure relates to a display surround for protecting a display area and, in particular, to trim elements for surrounds located around dials in automotive instrument panels. A display surround for protecting a display area comprises a perimeter wall for surrounding the display area and a wall capping piece. The wall extends from a base portion of the wall proximate the display area towards an end portion of the wall away from the display area. The end portion includes a top face, and the top face includes a groove. The capping piece has a tongue. The tongue includes a protuberance on opposite sides and the groove includes a recess on opposite sides. The capping piece is secured in place to cap the wall by seating the tongue within the groove and by engaging each protuberance with a corresponding recess.

20 Claims, 4 Drawing Sheets ured cover or lens in front of the display, or a transparent cover or lens in front of the display, from acci-

DISPLAY SURROUND

CROSS-REFERENCE TO RELATED APPLICATION

This application claims the benefit of priority of United Kingdom Patent Application No. 1021383.3 filed on Dec. 16, 2010 hereby incorporated herein by reference in its entirety.

FIELD OF THE INVENTION

This invention relates to a display surround for protecting a display area and, in particular, to trim elements for surrounds located around dials in automotive instrument panels.

BACKGROUND OF THE INVENTION

In most automotive instrument clusters, a protective surround, hood, or frame projects from the front face of the instrument panel and surrounds one or more dials forming part of the display. In this description, all such protective display surrounding features are referred to as "surrounds". These surrounds are designed primarily to shield the face of the dials from direct sunlight, thereby making them easier to read, but may also help protect the face of the display, or a transparent cover or lens in front of the display, from accidental contact. Particularly in automotive applications, the surround also has an aesthetic function and can be important in the styling of a vehicle dashboard.

In many cases, the transparent cover or lens extends across the surround to protect the front face of the dials from dust and prevent a user from interfering with the dials. Usually, however, at least a front edge of the surround protrudes from the cover and is accessible to a user of the vehicle.

In order to improve the aesthetics of the instrument panel, a decorative ring or trim element may be placed over a protruding edge of the surround. Traditionally, there are a number of methods that can be used to secure the decorative ring in position.

Saddle clips may be used to secure larger rings that are self-supporting. The saddle clips secure a bottom edge of the ring to an edge of the surround. However, these clips usually require a relatively large amount of space around the edge of the dial in order to have room to fix the saddle clip in position. This method is, therefore, not suited to slimmer designs of decorative rings.

Another method of securing a decorative ring is to use heat-staking. However, this method is not always possible in cluster designs in which there is limited access to the rear of the dial. In general, this method is only used on cluster designs having an open shape to the rear surface of the surround to prevent the heat staking tool from damaging other parts of the surround.

Alternatively, point clips may be used. The point clips project from the bottom edge of the decorative ring and are designed to pass through a hole in the dial surround. The clip is then pressed outwards to hold the ring securely in place. As with heat staking, this method of attachment is not suitable for cluster designs having limited rear access.

It would be desirable to develop an improved means of securing a decorative ring or trim element to a display surround such as a mask of an instrument cluster.

SUMMARY OF THE INVENTION

Consonant with the present invention, an improved means of securing a decorative ring or trim element to a display surround such as a mask of an instrument cluster, has surprisingly been discovered.

According to a first aspect of the invention, a display surround for protecting a display area is provided. The surround comprises a perimeter wall for surrounding said display area and a wall capping piece. The wall extends between a base portion and an end portion, the base portion being, in use, proximate said display area, and the end portion being, in use, furthest from said display area. The end portion has a top face including a groove and the capping piece has a tongue seated in the groove. The tongue and the groove have in an interface between the tongue and groove at least one retention feature. The retention feature is a protuberance engaged in a matching recess. The capping piece is secured in place to cap the wall by the seating of the tongue within the groove and by the engagement of each protuberance with a corresponding recess.

According to a second aspect of the invention, an instrument panel assembly comprising at least one display surround and a display area inside said surround, wherein the display surround is as described according to the first aspect of the invention, is provided.

The wall capping piece may then form a decorative ring or trim element for the display surround.

In another embodiment of the invention, the tongue has at least one protuberance and the groove has at least one corresponding recess. This arrangement may, however, be reversed, with the groove having at least one protuberance and the tongue having at least one corresponding recess.

The interface between the tongue and groove where the tongue is seated in the groove may extend around the full periphery of the wall.

The tongue may have a protuberance on opposite sides of the tongue, and the groove may have a corresponding recess on opposite sides of the groove.

This means of securing a wall capping piece as a trim element to a display surround has a number of advantages over the prior art.

The groove may extend around the full periphery of the wall and the tongue may extend continuously for the full length of said capping piece. Accordingly, the securing means of the present invention allows the wall capping piece to be secured to the wall around the complete periphery of the surround. The use of continuous fixing means along the full length of the capping piece means that, unlike in prior art arrangements, there are no weaker portions of the wall capping piece between discrete fixing points where the wall capping piece is more easily snapped or pulled away from the surround.

In applications in which the display surround is accessible to a user or viewer of the display, the capping piece is prone to being caught and pulled away from the surround. Continuous fixing of the capping piece, however, reduces this problem, as it is less likely that something will be pushed between the capping piece and the surround due to the engagement of the protuberances in their recesses which firmly secure the capping piece to the top portion of the wall.

Each protuberance may comprise a ridge and each recess may comprise a channel. The ridge may extend continuously for the full length of the tongue and the channel may extend around the full periphery of the wall.

The ridges and channels are easily incorporated into the usual moulding process used to form the wall capping piece and the groove of the display surround. The addition of these features, therefore, does not require additional manufacturing steps.

The ridge and channel may have complementary part-circular cross-sectional shapes, with a height and depth that is relatively shallow as compared with the width of each feature, such that each protuberance and channel is less than a full semi-circle. Typically, the steepest slope on the ridge or in the channel is no more than 45 degrees. This shape makes the ridge and channel relatively easy to manufacture during the moulding process. In addition, the tongue is relatively easily inserted into the groove with the ridge still locating positively within the channel, and also permits the wall capping piece to be removed again without breaking if required.

An inner side of the groove closest to the display may have a first protuberance, and an outer side of the groove opposite the inner side may have a second protuberance, the first and second protuberances being on directly opposite sides of the groove around at least a portion of the periphery of the wall, and the tongue having a pair of corresponding recesses for these protuberances.

Alternatively, an inner side of the groove closest the display may have a first recess, and an outer side of the groove opposite the inner side may have a second recess, the first and second recesses being on directly opposite sides of the groove around at least a portion of the periphery of the wall, and the tongue having a pair of corresponding protuberances for these recesses.

The groove, recesses, and the protuberances may all extend around the full periphery of the display surround.

On larger wall capping pieces or those located in more exposed positions, it may be preferable to include more than one protuberance on each side of the interface, and to form more than one corresponding recess on each side of the interface.

The use of several retention features may fix the trim element more securely to the display surround.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
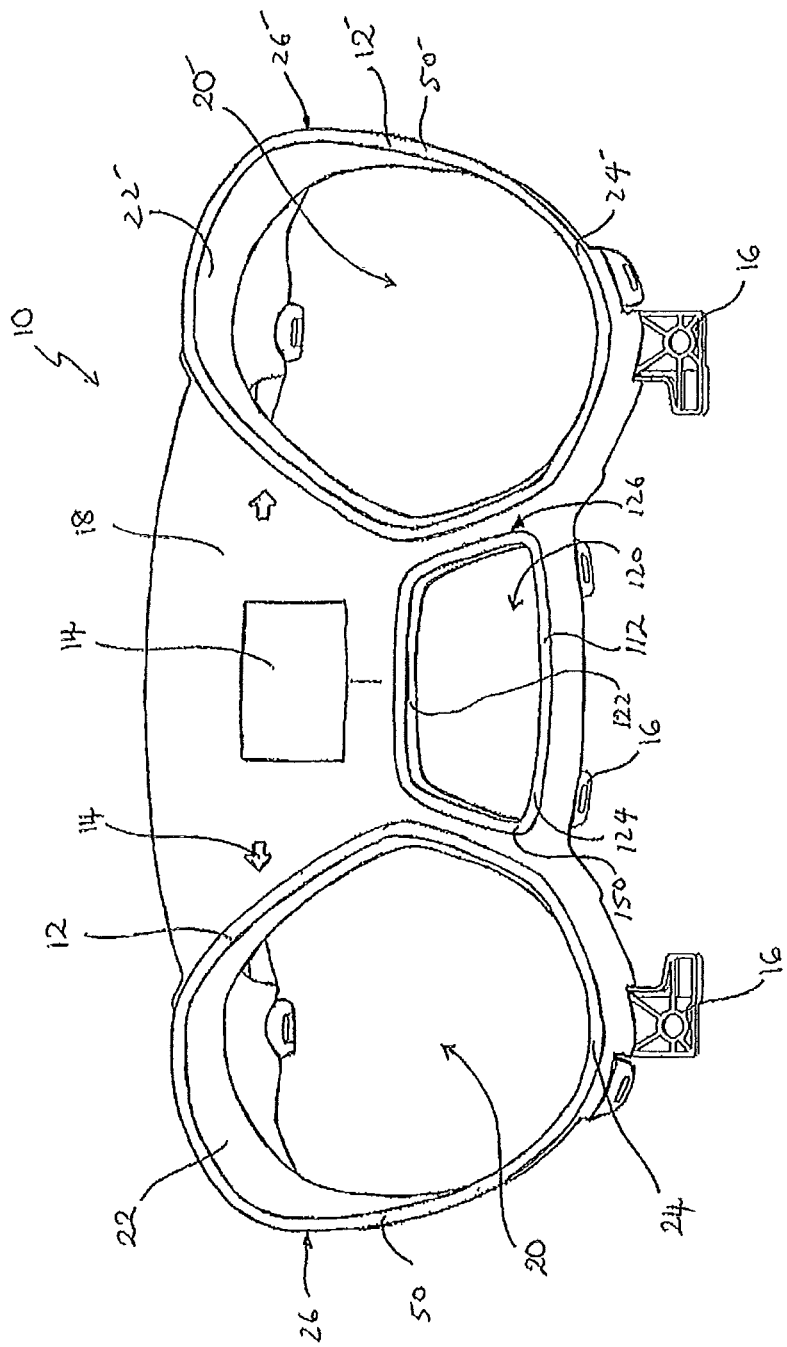
FIG. 1 is a front perspective view of an instrument cluster surround having a number of perimeter walls for surrounding separate display areas, and showing the location of a number of wall capping pieces, each of which forms a trim element for one of the walls, according to one embodiment of the invention.

FIG. 1 shows an instrument panel assembly 10 or casing for surrounding and enclosing an instrument cluster in a motor vehicle dashboard (not shown). In particular, the instrument panel assembly 10 comprises a number of display surrounds 12, 12', 112, each of which has a perimeter wall 26, 26', 126 for protecting display areas such as dials and gauges (not shown). As will be explained in more detail below, each wall is capped by a decorative wall capping piece 50, 50', 150, for example, a decorative ring.

Two of the surrounds 12, 12' have a substantially oval periphery and are mirror images of each other, and a smaller central surround 112 is substantially rectangular. The instrument panel assembly 10 may also include a number of other cut-outs 14 for the provision of an LCD screen, and indicator or warning lights. Typically, the instrument panel assembly 10 will also include a number of mounting brackets 16 for attaching the assembly 10 in position in a vehicle.

In this example, the instrument panel assembly 10 comprises two main display surrounds 12, 12' for surrounding and protecting two main dials (not shown). The surrounds 12, 12' may be of any desired shape but are typically substantially circular or oval to surround a single circular or oval dial. The smaller central surround 112 may surround a number of different display elements, for example warning lights or a number of small dials. These display surrounds 12, 12', 112 extend outward from a front face 18 of the panel 10, and each surround 12, 12', 112 extends around the complete periphery of an opening 20, 20', 120 designed to receive a face of a dial, for example, a speedometer or other display element. An upper region 22, 22', 122 of each surround 12, 12', 112 extends a greater distance from the front face 18 of the panel 10 than a lower region 24, 24', 124 thereby providing a hood 22, 22', 122 which blocks ambient light that would otherwise fall on the face of a dial when the assembly is positioned in a vehicle.

Each of the main display surrounds 12, 12' has a similar construction and, therefore, in the following description only one will be described in detail. The smaller central surround 112 may have a different construction than the two main display surrounds 12, 12' and will be described in greater detail.

Figure 2:
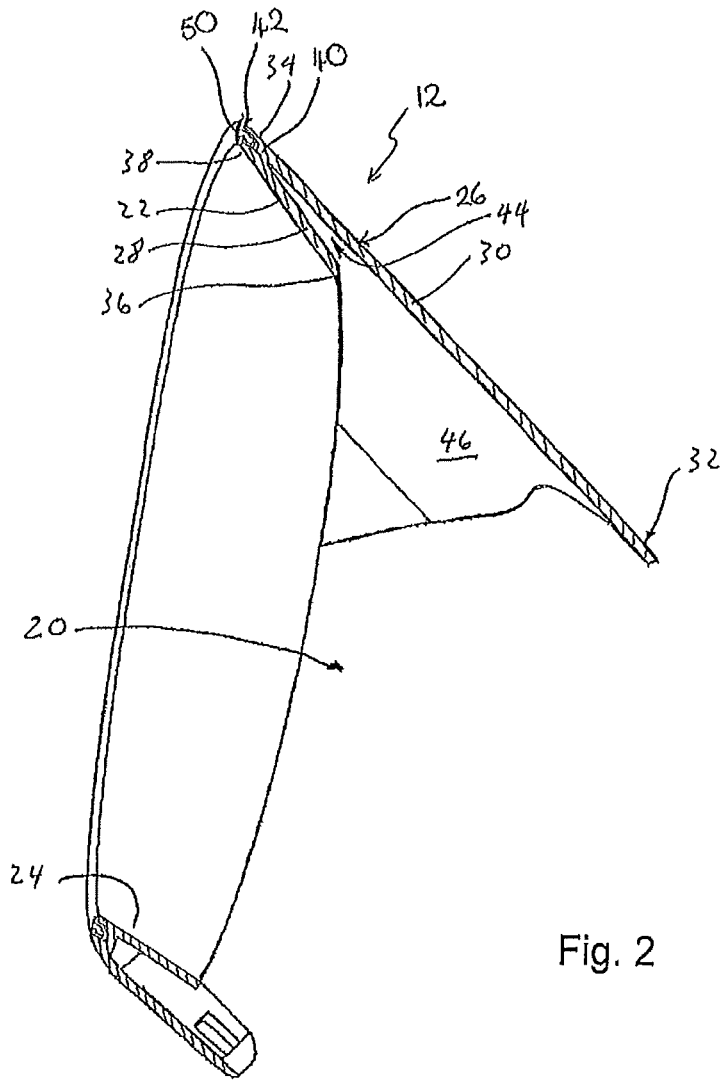
FIG. 2 is a fragmentary perspective view partially in section of a portion of the surround of FIG. 1 showing how the wall capping piece is affixed to the wall.

FIG. 2 shows a cross-sectional view of one of the main surrounds 12. The perimeter wall 26 and wall capping piece 50 are shown in more detail in FIG. 3. The perimeter wall 26 has an inner wall portion 28 and an outer wall portion 30. The outer wall portion 30 extends from a lower edge 32, which in this example forms an outer, rear edge of the panel, to an upper edge 34 that is located in front of a dial (not shown) when the panel 10 is fixed to an instrument cluster. The inner wall portion 28 extends from a base portion 36, which forms the edge of the opening 20 in the panel 10 and is located proximate the dial face when the panel 10 is fixed to an instrument cluster, to an upper edge 38, located in front of and extending away from the dial face.

The inner and outer wall portions 28, 30 are integrally formed so that the inner and outer wall portions 28, 30 are joined in an end portion 40 of the wall 26 and the upper edges 38, 34 of the inner and outer wall portions 28, 30 form a top face 42 of the wall 26. In this way, a tapered channel or cavity 44 is formed between the inner and outer wall portions 28, 30 in a rear side 46 of the surround 12.

Figure 3:
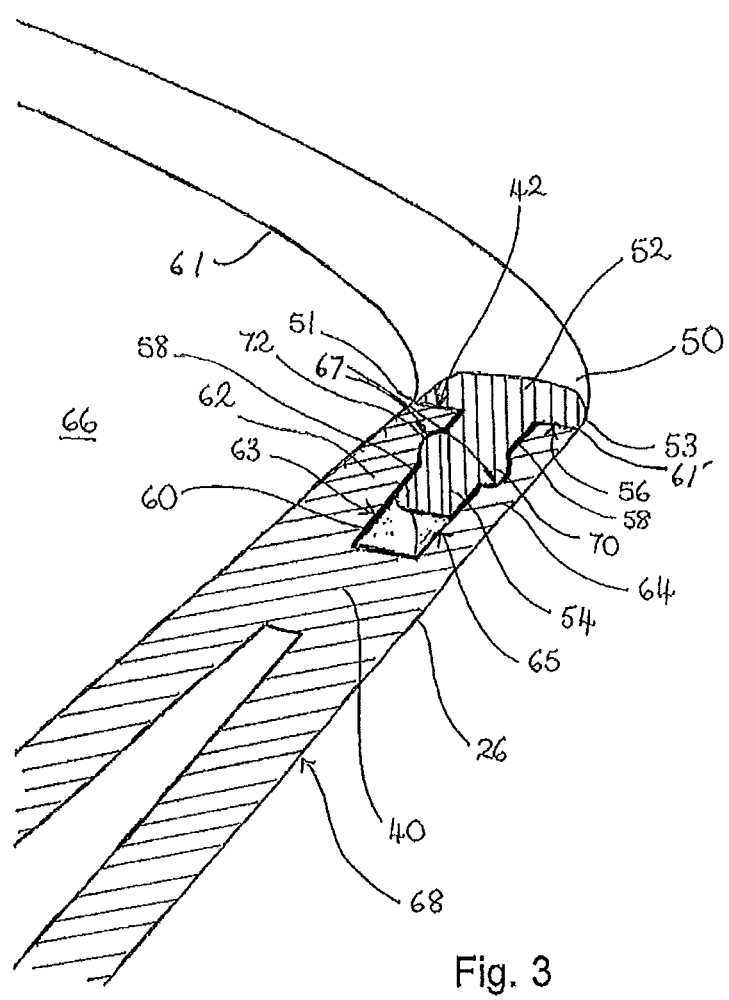
FIG. 3 is an enlarged, fragmentary perspective view partially in section of the front edge of the surround and the trim element of FIG. 2 showing the means of attachment of the trim element to the surround.

Because the top face 42 of the surround wall 26 faces a user of the instrument panel, it is desirable to include a decorative rim or trim element by fitting a capping piece 50 on or around the end portion 40 so that the wall capping piece covers the top face 42 of the surround wall 26, as shown in FIG. 3.

In this embodiment, the trim element 50 has a substantially T-shaped cross-section, as shown in FIG. 3. The wall capping piece 50 comprises a front cap portion 52 and an engaging rib or tongue 54 that extends from a rear face 56 of the cap portion 52. The width of the cap portion 52 is substantially equal to the width or thickness of the top face 42 of the wall 26, so that the cap portion 52 completely covers the top face 42 when secured in position on the wall 26. Both the cap portion 52 and the tongue 54 extend fully around the periphery of the surround 12.

The end portion 40 of the surround wall 26 includes a channel or groove 60 extending from the top face 42 of the wall 26 towards the rear 46 of the surround wall 12. Prior to fitting the wall capping piece 50 to the wall 26, the groove 60 is open in the top face 42 of the wall. The groove 60 defines an inner wall segment 62 and an outer wall segment 64 on either side of the groove 60 such that an outer surface 63 of the inner wall segment 62 and an inner surface 65 of the outer wall segment 64 form opposing sides of the groove 60. The groove 60 continuously extends with a uniform cross-section around the full periphery of the wall 26.

The thickness of the tongue 54 of the wall capping piece 50 is substantially equal to or slightly less than the width of the groove 60 in the surround wall 26 such that the tongue 54 may be received within the groove 60. Typically, the thickness of the tongue 54 is substantially equal to the width of the groove 60 so that there is a push fit of the tongue 54 in the groove 60, and so that the tongue 54 does not move laterally within the groove 60 once seated. The position of the tongue 54 relative to the cap portion 52 of the wall capping piece 50 means that when the tongue 54 is received within the groove 60, a first edge 51 of the cap portion 52 is aligned with an inner face 66 of the wall 26 and a second edge 53 of the cap portion 52 is aligned with an outer face 68 of the wall 26.

To retain the tongue 54 within the groove 60, the sides 58 of the tongue 54 and the sides 63, 65 of the groove 60 include corresponding retention features formed at an interface 67 between the tongue 54 and groove 60 in the form of matching protuberances 70 and recesses 72. In one embodiment, both sides 58 of the tongue 54 include protuberances 70 in the form of elongated, raised and rounded bands or ridges 70. Each side 58 has a single rounded ridge 70 located approximately halfway down the tongue 54. The ridges 70 have a circular profile in cross-section, with a height that is relatively shallow compared to the width, and the ridges extend continuously for the full length of the tongue 54. Each side 63, 65 of the groove 60 includes a corresponding recess 72 in the form of an elongate indentation or channel 72. The recesses 72 have a semi-circular cross-sectional shape and extend continuously around the full periphery of the surround wall 26.

As the tongue 54 of the wall capping piece 50 is inserted in the groove 60 in the end portion 40 of the wall 26, the ridges 70 first contact a top edge of the outer surface 63 of the inner wall segment 62 and a top edge of the inner surface 65 of the outer wall segment 64. As the tongue 54 is pressed further into the groove 60, the ridges 72 cause the inner and outer wall segments 62, 64 to flex and to move apart such that the groove 60 widens proximate the top face 42 of the wall 26 to accommodate the increased width of the ridges 70. As the ridges 70 move down the sides of the groove 60, the inner and outer wall segments 62, 64 continue to flex outwards until the ridges 70 are positioned in the recesses 72 in the sides of the groove 60. At this point, the inner and outer wall segments 62, 64 are able to return to their original positions thereby clamping the tongue 54 within the groove 60 with the ridges 70 engaged within the recesses 72. When the tongue 54 is fully seated within the groove 60, the rear face 56 of the cap portion 52 on either side of the tongue 54 abuts the top face 42 of the wall 26, such that the wall capping piece 50 is secured in place to cap the surround wall 26. The engagement between the wall capping piece 50 and the groove 60 is such that there is a tight seam 61, 61' on both faces 66, 68 of the wall where the cap portion 52 abuts the top face 42 of the wall. In this example, the external surfaces of the wall 26 and wall capping piece 50 on either side of the seam 61, 61' are flush with each other.

Although the wall capping piece 50 has been described as covering the top surface 42 of the surround wall 26, in other embodiments it may be preferable for the cap portion 52 of the wall capping piece 50 to sit within an enlarged portion of the groove 60, such that at least a part of the cap portion 52 is countersunk within the end portion 40 of the wall 26. Alternatively, the wall capping piece 50 may extend beyond the top surface 42 of the peripheral wall 26, on either or both of the faces 66, 68 of the wall, and in some embodiments the cap portion 52 may be formed in a U-shape so that the edges of the cap portion 52 overlap the top surface 42 and lie against an end portion of the inner and outer faces 66, 68 of the wall 26. A benefit of this arrangement is that the seams 61, 61' may then be visually concealed from the user of the display.

Figure 4:
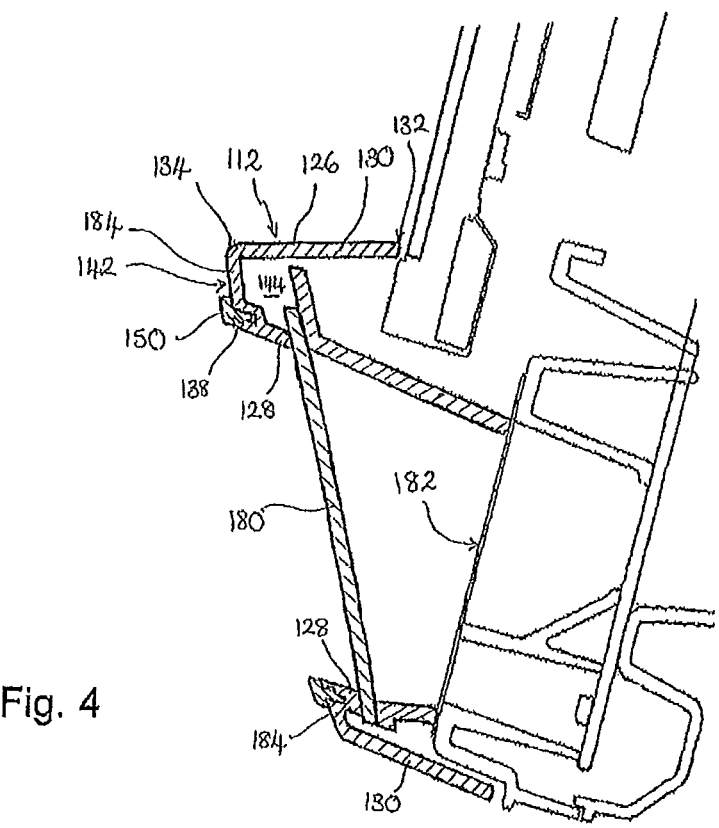
FIG. 4 is a fragmentary cross-sectional elevational view of a portion of a surround of FIG. 2, showing a wall capping piece affixed to the wall of the surround according to another embodiment of the invention.

FIG. 4 shows a cross-sectional view of the central surround 112. A part of the perimeter wall 126 and the wall capping piece 150 are shown in more detail in FIG. 5.

In this second embodiment, the perimeter wall 126 has an inner wall portion 128 as previously described in the first embodiment. The inner wall portion 128 extends from a base portion 136, which in this example is in contact with a front face of a transparent protective cover 180, which is in turn located in front of, and spaced apart from, a dial face 182, to an upper edge 138 located in front of and away from the protective cover 180.

The outer wall portion 130 is spaced apart from the inner wall portion 128 and extends from a lower edge 132 that is located behind a plane defined by the protective cover 180, to an upper edge 134 that is located in front of the plane defined by the protective cover 180. As such, the outer wall portion 130 surrounds the perimeter of the protective cover 180.

The inner and outer wall portions 128, 130 are joined at their upper ends by a rim 184. A top face 142 of the rim 184 joins the upper edge 138 of the inner wall portion 128 and the upper edge 134 of the outer wall portion 130. In this way, a cavity 144 is formed behind the rim 184 and between the inner and outer wall portions 128, 130.

Figure 5:
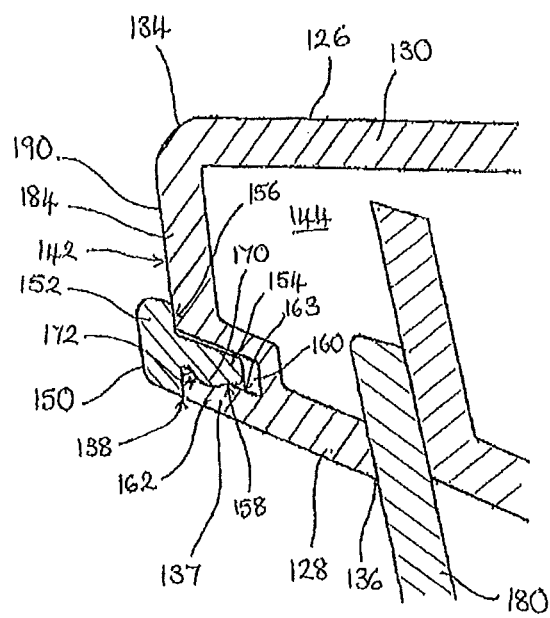
FIG. 5 is an enlarged fragmentary cross-sectional elevational view of a portion of the surround and the wall capping piece of FIG. 4, showing the means of attachment of the trim element to the surround.

A channel or groove 160, as shown in FIG. 5, extends from the top face 142 towards the rear of the surround 112. In this example, the groove 160 is located substantially within an end region 137 of the inner wall portion 128. To accommodate the width of the groove 160, the end region 137 may be thicker than the rest of the inner wall portion, as shown in FIG. 5.

The groove 160 defines an inner wall segment 162, so that an outer surface 163 of the inner wall segment 162 forms one side of the groove 160. A recess 172 is present in the side 163 of the groove 160 formed by the inner wall segment 162, and, in this example, the recess 172 has a semi-circular cross-sectional shape.

The wall capping piece 150 of this embodiment is similar to the wall capping piece 50 of the previous embodiment. However, a protuberance 170 is present on only one side 158 of the tongue 154 of the wall capping piece 150. A single, rounded ridge 170 is located approximately halfway down one side of the tongue 154.

The ridge 170 is included on the side of the tongue 154 that contacts the side 163 of the groove formed by the inner wall segment 162.

As the tongue 154 of the wall capping piece 150 is inserted in the groove 160, the ridge 170 first contacts a top edge of the outer surface 163 of the inner wall segment 162. As the tongue 154 is pressed further into the groove 160, the ridge 170 causes the inner wall segment 162 to flex such that the groove 160 widens to accommodate the increased width of the tongue 154 at the ridge 170. The tongue 154 is pressed into the groove 160 until the ridge 170 is positioned in the recess 172, and the inner wall segment 162 is able to return to its original position thereby clamping the tongue 154 within the groove 160.

With the tongue 154 fully sealed within the groove 160, such that the ridge 170 is engaged in the recess 172, the rear face 156 of the cap portion 152 of the wall capping piece 150 abuts the top face 142.

In this embodiment, the width of the cap portion 152 is less than the width of the rim 184 such that when the capping piece 150 is inserted, an outer portion 190 of the rim 184 remains visible to a user of the display. In alternative embodiments, the capping piece 150 may be designed such that the cap portion 152 covers substantially all of the top face 142 of the rim 184.

In this embodiment, retention features are only present on one side of the tongue and groove, respectively, as it is only the inner wall segment 162 that is able to flex to accommodate the ridge 170 due to the presence of the rim 184.

In other embodiments, the tongue and groove may include more than one retention feature on one or both sides. For example, the tongue 54 may include two or more ridges 70 on each side of the tongue 54 spaced apart down the tongue, with the groove 60 comprising two or more corresponding channels 72. The use of multiple retention features on each side means that the wall capping piece 50 is held more securely within the groove 60.

In another embodiment, the protrusions 70 and corresponding recesses 72 have a semi-circular cross-sectional shape, with a depth that is relatively shallow as compared with the width. However, in other embodiments it may be desirable to use other shapes to accommodate the recess 72 within a particular shape of a surround wall 26.

The protrusions 70 should be shaped such that it is relatively easy to push the tongue 54 into the groove 60. It is also an advantage if the protrusions 70 are shaped so that the wall capping piece 50 can also be pulled out of the groove 60 if required, for example, to replace a scratched or chipped wall capping piece 50, or to allow interchangeable wall capping pieces 50 to be supplied to a customer.

Although the protrusions 70 have been shown halfway down the side of the tongue 54, in other embodiments, laterally extending protrusions may be located at or proximate the end of the tongue 54, which is positioned in an undercut portion of the groove 60.

One advantage of the invention is that the wall capping piece 50 may be formed from different materials or have a different appearance to the underlying wall 26. The wall capping piece 50 may, for example, be formed from a material that is more flexible and less hard than the wall 26, or may be a different color or pattern. This makes it easier and more economical for an automotive display manufacturer to change the appearance of the display for use in different vehicles.

Although the above embodiments have been described in relation to a wall capping piece 50 and surround 12 for an automotive instrument cluster, it will be understood that the present invention may be used to securely fix a wall capping piece 50 to any form of display surround 12.

Furthermore, although the invention has been described in terms of a retention feature in which the protuberance is on the tongue 54 and the corresponding recess 72 is in the groove 60, this arrangement could be reversed such that the protuberance 70 is in the groove 60 and the corresponding recess 72 is in the tongue 54.

The invention therefore provides an improved means of securing a decorative ring or trim element to a display surround, especially when access to the rear of the display surround is limited.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A display surround for protecting a display area, the display surround comprising:
   a perimeter wall surrounding the display area;
   an end portion of the wall including a top face having a groove with at least one of a recess and a protuberance formed therein;
   a base portion of the wall adjacent the display area, wherein the base portion is disposed between the display area and the end portion; and
   a wall capping piece including a tongue with at least one of a protuberance and a recess formed thereon;
   wherein the at least one of the recess and the protuberance of the groove cooperates with the at least one of the protuberance and the recess of the tongue to releasably secure the tongue in the groove.

2. The display surround according to claim 1, wherein the groove includes a plurality of recesses and the tongue includes a plurality of protuberances.

3. The display surround according to claim 2, wherein each of the plurality of protuberances has a semi-circular profile.

4. The display surround according to claim 1, wherein the groove includes a plurality of protuberances and the tongue includes a plurality of recesses.

5. The display surround according to claim 4, wherein each of the plurality of protuberances has a semi-circular profile.

6. The display surround according to claim 1, wherein the tongue includes a first protuberance on a first side thereof and a second protuberance on a second side thereof opposite the first side, and the groove includes a first recess on a first side thereof corresponding to the first protuberance, and a second recess on a second side thereof corresponding to the second protuberance.

7. The display surround according to claim 1, wherein the tongue includes a first recess on a first side thereof and a second recess on a second side thereof opposite the first side, and the groove includes a first protuberance on a first side thereof corresponding to the first recess, and a second protuberance on a second side thereof corresponding to the second recess.

8. The display surround according to claim 1, wherein the tongue and the groove extend continuously around the wall.

9. The display surround according to claim 1, wherein the at least one of the protuberance and the recess of the tongue and the at least one of the recess and the protuberance of the groove extend continuously around the wall.

10. The display surround according to claim 1, wherein the wall capping piece is a continuous ring extending around the wall.

11. A display surround for protecting a display area, the display surround comprising:
    a perimeter wall surrounding the display area;

an end portion of the wall including a top face having a groove with at least one protuberance;

a base portion of the wall adjacent the display area, wherein the base portion is disposed between the display area and the end portion; and a wall capping piece including a tongue with at least one recess;

wherein the at least one protuberance of the groove cooperates with the at least one recess of the tongue to releasably secure the tongue in the groove.

12. The display surround according to claim 11, wherein the groove includes a plurality of protuberances and the tongue includes a plurality of recesses.

13. The display surround according to claim 12, wherein each of the plurality of protuberances has a semi-circular profile.

14. The display surround according to claim 11, wherein the tongue includes a first recess on a first side thereof and a second recess on a second side thereof opposite the first side, and the groove includes a first protuberance on a first side thereof corresponding to the first recess, and a second protuberance on a second side thereof corresponding to the second recess.

15. The display surround according to claim 11, wherein the tongue and the groove extend continuously around the wall.

16. The display surround according to claim 11, wherein the at least one recess of the tongue and the at least one protuberance of the groove extend continuously around the wall.

17. A display surround for protecting a display area, the display surround comprising:

a perimeter wall surrounding the display area;

an end portion of the wall including a top face having a groove with at least one recess;

a base portion of the wall adjacent the display area, wherein the base portion is disposed between the display area and the end portion; and a wall capping piece including a tongue with at least one protuberance;

wherein the at least one recess of the groove cooperates with the at least one protuberance of the tongue to releasably secure the tongue in the groove.

18. The display surround according to claim 17, wherein the groove includes a plurality of recesses and the tongue includes a plurality of protuberances.

19. The display surround according to claim 18, wherein each of the plurality of protuberances has a semi-circular profile.

20. The display surround according to claim 17, wherein the at least one protuberance of the tongue and the at least one recess of the groove extend continuously around the wall.

* * * * *